(12) United States Patent
Tokuyama et al.

(10) Patent No.: US 7,321,250 B2
(45) Date of Patent: Jan. 22, 2008

(54) INTEGRATED CIRCUIT DEVICE

(75) Inventors: Katsumi Tokuyama, Osaka (JP); Takeshi Hirayama, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 29 days.

(21) Appl. No.: 11/440,073

(22) Filed: May 25, 2006

(65) Prior Publication Data
US 2006/0267655 A1  Nov. 30, 2006

(30) Foreign Application Priority Data
May 27, 2005 (JP) .............................. 2005-154765

(51) Int. Cl.
*H03H 11/26* (2006.01)

(52) U.S. Cl. .................................. 327/261; 327/291

(58) Field of Classification Search ........ 327/261–264, 327/270–271, 276–277, 291–299; 375/371–372; 713/400
See application file for complete search history.

(56) References Cited

U.S. PATENT DOCUMENTS 6,507,230 B1 * 1/2003 Milton ........................ 327/291
6,928,570 B2 * 8/2005 Fukuda ....................... 713/400

* cited by examiner

*Primary Examiner*—Linh My Nguyen
(74) *Attorney, Agent, or Firm*—Steptoe & Johnson LLP

(57) ABSTRACT

An integrated circuit device is provided which can increase a stable area having less digital noise. A data delay adjustment circuit group (110) is fed with data outputted from a flip-flop circuit group (106), adjusts a delay of the data so as to synchronize the operation of a data output terminal group (114) with the operation of a logic circuit (100), and outputs the data to the data output terminal group (114). A clock delay adjustment circuit (109) similarly adjusts a delay of a clock outputted from an inverter (105) and outputs the clock to a clock output terminal (113). Therefore, the operations of data output terminals are synchronized with the operation of the logic circuit (100) while keeping the phase relationship between an external output clock and external output data.

4 Claims, 7 Drawing Sheets

INTEGRATED CIRCUIT DEVICE

FIELD OF THE INVENTION

The present invention relates to an integrated circuit device which includes at least a logic circuit serving as a synchronous circuit and outputs in parallel data generated in the logic circuit, the data being outputted with an internal reference clock used in the logic circuit.

BACKGROUND OF THE INVENTION

An integrated circuit device for processing a camera signal is fed with an analog signal from an image sensor or the like incorporated into a system, performs signal processing on the signal to generate a digital image signal, and outputs the signal to an image display unit incorporated into the system or an external monitor.

To be specific, an integrated circuit device for processing a camera signal is first fed with an analog signal from an image sensor or the like of the previous stage, performs signal processing on the signal in an analog processing circuit such as an analog front end (AFE) or the like to convert the signal to a digital signal, and then performs signal processing on the digital signal in a logic circuit to generate a video signal, a synchronizing signal, and so on. Thereafter, the integrated circuit device digitally outputs the signals to the image display unit or the like of the following stage in parallel together with an internal reference clock having been used in the logic circuit.

In order to easily design the timing of capturing data in the circuit of the following stage, the integrated circuit device for processing a camera signal has a mechanism for adjusting the phase of the internal reference clock to be outputted to the outside and the phases of signals including the video signal and the synchronizing signal, which are outputted to the outside, to regulate timing of output.

FIG. 7 is a schematic structural diagram showing a part of a conventional integrated circuit device for processing a camera signal. FIG. 8 is a timing chart for explaining the operations of the conventional integrated circuit device for processing a camera signal.

In the conventional integrated circuit device, after signal processing is performed on an analog signal from the image sensor or the like to convert the signal to a digital signal, signal processing is performed on the digitized signal in a logic circuit 200, desired data (digital signals) such as the video signal and the synchronizing signal is generated, and the data is outputted to the data terminals of the flip-flop circuits of a flip-flop circuit group 204. As shown in FIG. 8, the timing of internal data 202 including the video signal and the synchronizing signal is synchronized with the rising edge of an internal reference clock 201.

The logic circuit 200 is a synchronous circuit. The internal reference clock used in the logic circuit 200 is outputted to an inverter 203 and the clock terminals of the flip-flop circuits of the flip-flop circuit group 204.

The internal reference clock 201 having been inputted to the inverter 203 is inverted in phase and outputted to a clock output terminal 207 as an external output clock. The internal data having been inputted to the flip-flop circuits of the flip-flop circuit group 204 is outputted as external output data to the data output terminals of a data output terminal group 208 in synchronization with the rising edge of the internal reference clock. Therefore, as shown in FIG. 8, the timing of external output data 206 and the timing of an external output clock 205 are in opposite phase.

As described above, in the conventional integrated circuit device for processing a camera signal, the phase of the external output clock outputted in parallel and the phases of the external output data including the video signal and the synchronizing signal are adjusted by using the inverter and the flip-flop circuits to regulate the timing of output.

However, in the conventional integrated circuit device for processing a camera signal, delay caused by the influence of an internal layout (elements placed between the logic circuit and the output terminals and the wire lengths of the elements) and an external load has not been taken into consideration. For this reason, as shown in FIG. 8, the external output clock 205 and the external output data 206 are delayed and a phase difference occurs between the external output clock 205 and the external output data 206 and the internal reference clock 201 and the internal data 202, so that an area of digital noise increases and picture quality degrades. The following will describe this conventional problem.

First, regarding fluctuations of the power of the integrated circuit device, since the logic circuit operates in synchronization with the internal reference clock, as shown in FIG. 8, a power fluctuation area 209 of the logic circuit is distributed from the rising edge of the internal reference clock. On the other hand, fluctuations of the power of the output terminal depend upon a change point of the external output data and a change point of the external output clock. When a phase difference occurs between the internal reference clock and the external output clock and between the internal data and the external output data, as shown in FIG. 8, a power fluctuation area 210 of the output terminal is displaced from the power fluctuation area 209 of the logic circuit 209.

In the integrated circuit device, much digital noise occurs when the processing of the digital signal changes. When the processing is not performed or the processing of the digital signal does not change, digital noise does not occur. Thus the area of digital noise of the integrated circuit device is distributed in an area where one of the power fluctuation area of the logic circuit and the power fluctuation area of the output terminal is present. Therefore the area of digital noise is distributed as shown in FIG. 8. In the presence of a phase difference between the internal reference clock and the external output clock and between the internal data and the external output data, the area of digital noise increases. On the other hand, an area having less digital noise is distributed in an area where neither of the power fluctuation areas of the logic circuit and output terminal is present. Hence, in the presence of a phase difference between the internal reference clock and the external output clock and between the internal data and the external output data, an area 212 having less digital noise is reduced as shown in FIG. 8.

Further, the area having less digital noise varies with the operating frequency of the integrated circuit device. The area increases at a slow operating frequency and decreases as the operating frequency increases.

In a camera system, such digital noise acts as a noise source to an analog signal in an image sensor and an analog processing circuit, so that an S/N ratio decreases and picture quality degrades. Particularly in recent years, the range of uses of cameras has expanded to cellular phones and so on. Camera systems used for cellular phones have had a larger number of pixels, have been miniaturized, and have had faster operating frequencies, so that an area having less digital noise decreases and picture quality degraded by digital noise.

FIG. 9 shows propagation of digital noise in a camera system.

As shown in FIG. 9, digital noise occurring in a logic circuit 215 propagates to an image sensor 213 and an AFE 214. Moreover, digital noise occurring in an output terminal group 216 similarly propagates to the image sensor 213 and the AFE 214. As described above, in this camera system, digital noise propagates through two systems. In the presence of a phase difference between the internal reference clock and the external output clock and between the internal data and the external output data, a stable area having less digital noise decreases which allows the image sensor 213 and the AFE 214 to stably operate without being affected by digital noise.

In order to minimize the influence of digital noise, it is necessary to perform analog processing in a stable area, that is, an area where the power fluctuations of the logic circuit 212 and an output terminal 216 are minimized. However, as the operating frequency becomes faster, the stable area having less digital noise decreases and it becomes difficult to adjust the timing of analog processing to stably acquire the best picture quality.

A conventional technique for reducing the influence of digital noise is proposed, in which power fluctuations are averaged out by shifting a phase between the bits of parallel output and thus the influence of noise is reduced (For example, Japanese Patent Laid-Open No. 11-7349 (FIG. 1)).

However, when shifting the timing of outputting (phase) an external output clock and external output data including a video signal, it becomes difficult in the processing of the following stage to design the timing of receiving data by using the external output clock from an integrated circuit device. Further, the best picture quality cannot be achieved, though the influence of digital noise can be reduced. The optimum S/N ratio can be obtained when analog processing is performed in a stable area with minimum power fluctuations and the influence of digital noise is minimized.

DISCLOSURE OF THE INVENTION

In view of the problems, an object of the present invention is to provide an integrated circuit device which can increase a stable area having less digital noise.

In order to attain the object, in the present invention, the power fluctuation area of an output terminal and the power fluctuation area of a logic circuit are overlaid on each other by delaying an external output clock and external output data while keeping its phase relationship.

The integrated circuit device of the present invention includes a logic circuit operating in synchronization with an internal reference clock and performing signal processing on a digital signal to generate multiple pieces of data, adjusts the phase of the internal reference clock to generate an external output clock, adjusts a phase of the data generated by the logic circuit to generate external output data, and outputs the clock and the data in parallel from a clock output terminal and data output terminals, the integrated circuit device comprising:

a delay adjustment circuit which is fed with the internal reference clock and adjusts the delay of the clock, flip-flop circuits which are fed with the data generated by the logic circuit and output the data as the external output data to the data output terminals in synchronization with a clock outputted from the delay adjustment circuit, and an inverting circuit for inverting the clock outputted by the delay adjustment circuit and outputting the clock as the external output clock to the clock output terminal.

According to the integrated circuit device of the present invention, the delay adjustment circuit adjusts the delay so as to synchronize the operations of the data output terminals with the operation of the logic circuit.

The integrated circuit device of the present invention further comprises an inversion control circuit which is fed with the internal reference clock and can select whether the internal reference clock should be inverted and outputted or outputted as it is to the delay adjustment circuit.

According to the integrated circuit device of the present invention, the delay adjustment circuit comprises flip-flop circuits placed in series in multiple stages and a selector for selectively outputting outputs of the flip-flop circuits, the flip-flop circuit operating in synchronization with a clock n-times (n is a positive integer) in frequency than that of the internal reference clock.

The integrated circuit device of the present invention includes a logic circuit operating in synchronization with an internal reference clock and performing signal processing on a digital signal to generate multiple pieces of data, adjusts a phase of the internal reference clock to generate an external output clock, adjusts a phase of the data generated by the logic circuit to generate external output data, and outputs the clock and the data in parallel from a clock output terminal and data output terminals, the integrated circuit device comprising:

flip-flop circuits which are fed with the data generated by the logic circuit and output the data in synchronization with the internal reference clock, an inverting circuit for inverting and outputting the internal reference clock, data delay adjustment circuits which are fed with the data outputted by the flip-flop circuits, adjust the delays of the data, and output the data as the external output data to the data output terminals, and a clock delay adjustment circuit which is fed with the clock outputted by the inverting circuit, adjusts a delay of the clock, and outputs the clock as the external output clock to the clock output terminal.

According to the integrated circuit device, the data delay adjustment circuit adjusts the delay so as to synchronize the operations of the data output terminals with an operation of the logic circuit, and the clock delay adjustment circuit adjusts the delay such that the external output clock is in opposite phase to the internal reference clock without any delay.

The integrated circuit device of the present invention further comprises an inversion control circuit which is fed with the internal reference clock and can select whether the internal reference clock should be inverted and outputted or outputted as it is to the flip-flop circuits and the inverting circuit.

According to the integrated circuit device of the present invention, the data delay adjustment circuit and the clock delay adjustment circuit each comprise flip-flop circuits placed in series in multiple stages and a selector for selectively outputting outputs of the flip-flop circuits, the flip-flop circuit operating in synchronization with a clock n-times (n is a positive integer) in frequency than that of the internal reference clock.

According to the present invention, the power fluctuation area of the output terminal and the power fluctuation area of the logic circuit are overlaid on each other, so that a stable area having less digital noise can be increased. Therefore a camera system using the integrated circuit device of the present invention makes it possible to adjust the timing of analog processing and easily perform analog processing in the stable area having less digital noise, so that the influence of digital noise is minimized and the best picture quality can be stably obtained.

The present invention makes it possible to easily achieve analog processing in a stable area less susceptible to the influence of digital noise even in a small camera system having a large number of pixels. Further, the stable area and the adjustment range become larger and thus the picture quality can be easily adjusted.

According to the present invention, since the stable area increases, high picture quality can be achieved and an operation margin for absorbing the influence of individual variations or the like can be obtained.

DESCRIPTION OF THE EMBODIMENTS

With reference to the accompanying drawings, the following will describe an integrated circuit device for processing a camera signal according to an embodiment of the present invention.

Figure 1:
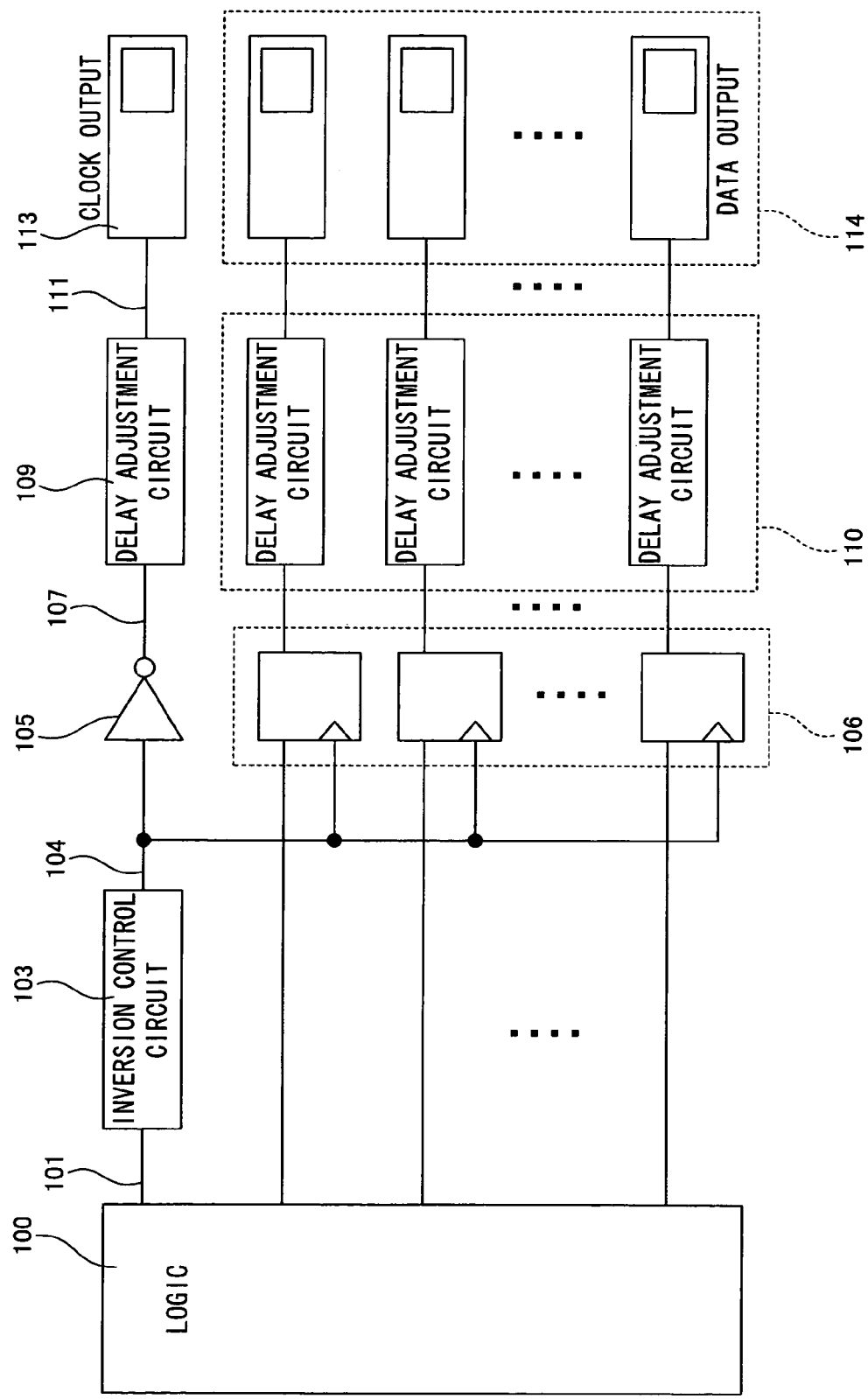
FIG. 1 is a schematic structural diagram showing a part of an integrated circuit device for processing a camera signal according to an embodiment of the present invention.
Figure 9:
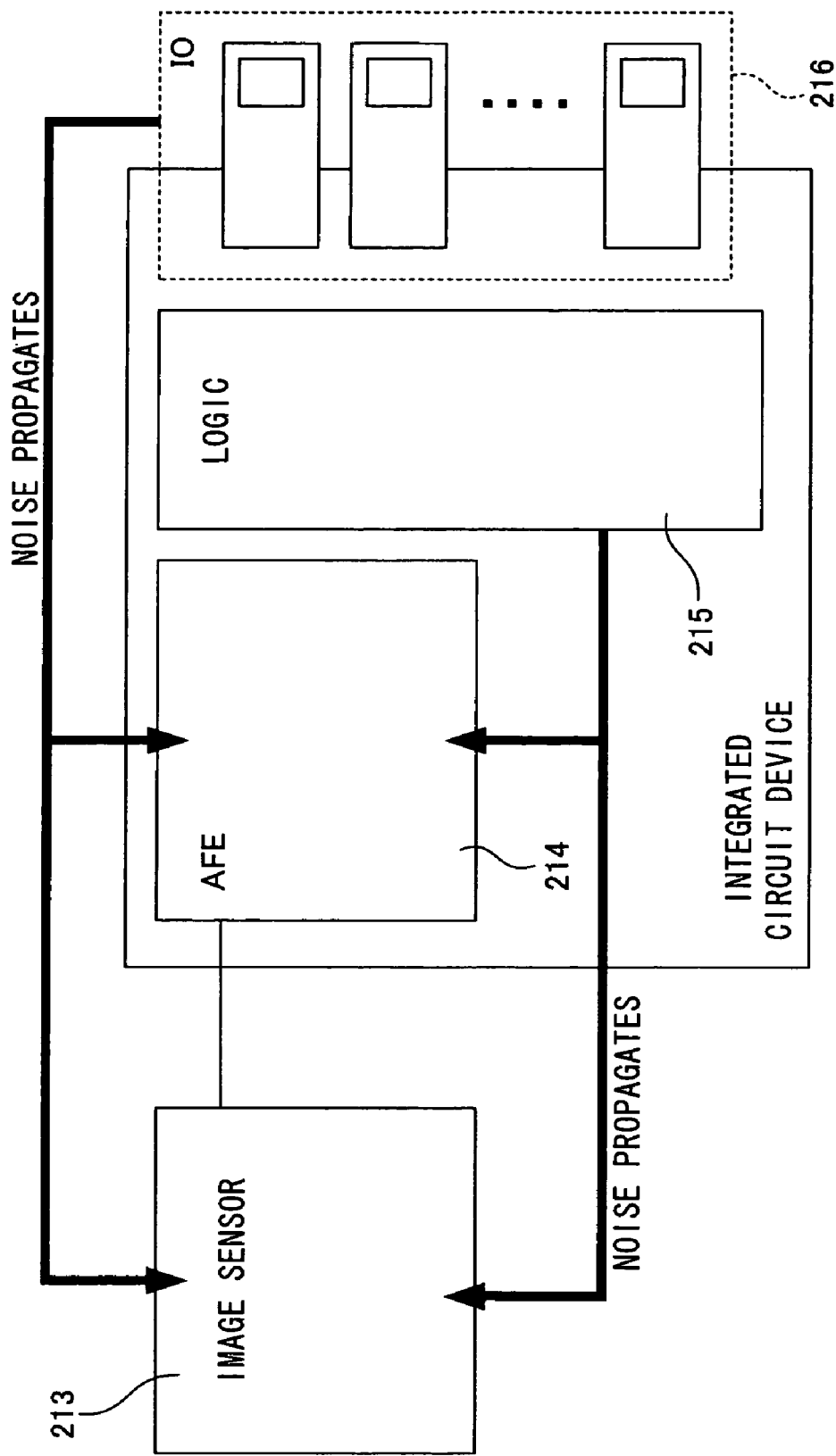
FIG. 9 is a diagram showing propagation of digital noise in a conventional camera system.

FIG. 1 is a schematic structural diagram showing a part of the integrated circuit device for processing a camera signal according to the present embodiment. The configuration of a camera system including the integrated circuit device is identical to, for example, that of FIG. 9. In the integrated circuit device, an analog processing circuit (not shown) such as an AFE is provided in the previous stage of a logic circuit.

Figure 2:
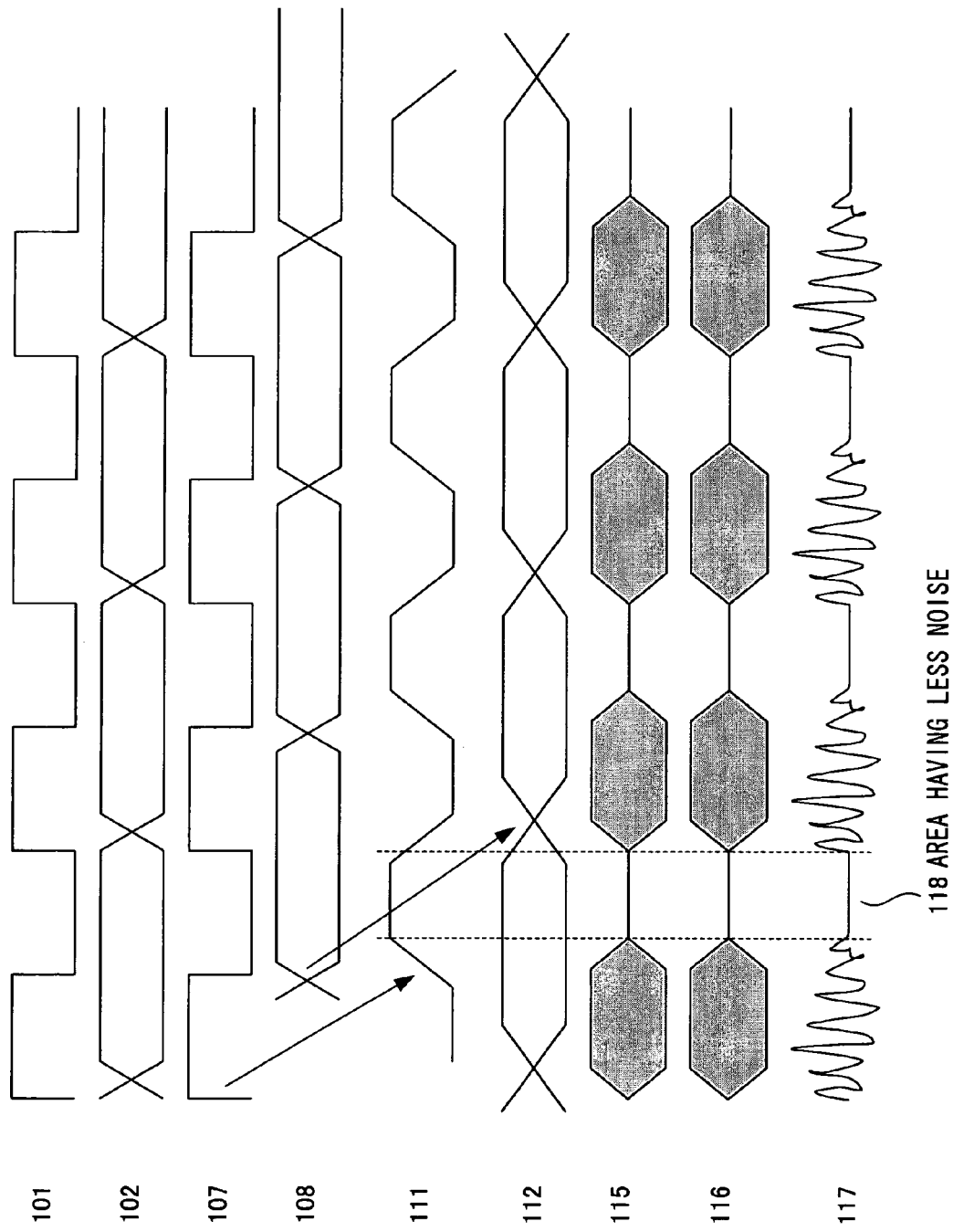
FIG. 2 is a diagram showing a timing chart for explaining the operations of the integrated circuit device for processing a camera signal according to the embodiment of the present invention.

FIG. 2 is a diagram showing a timing chart for explaining the operations of the integrated circuit device for processing a camera signal according to the present embodiment. However, in the timing chart of FIG. 2, delay caused by the influence of an internal layout (elements placed between the logic circuit and output terminals and the wire lengths of the elements) and an external load has not been taken into consideration.

In FIG. 1, a logic circuit 100 serving as a synchronous circuit operates in synchronization with an internal reference clock. The logic circuit 100 performs signal processing on a signal having been digitally converted in the AFE or the like of the previous stage, generates desired data (digital signals) such as a video signal and a synchronizing signal, and outputs the signals to the data terminals of the flip-flop circuits of a flip-flop circuit group 106. As shown in FIG. 2, the timing of internal data 102 including the video signal and the synchronizing signal is synchronized with the rising edge of an internal reference clock 101.

The internal reference clock 101 is also outputted from the logic circuit 100 and inputted to an inversion control circuit 103. The inversion control circuit 103 can select whether the internal reference clock 101 should be inverted and outputted or outputted as it is.

Figure 3:
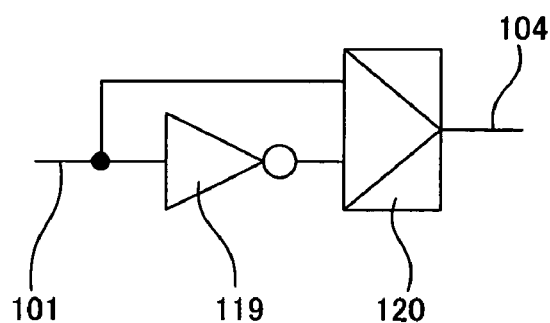
FIG. 3 is a diagram showing a structural example of an inversion control circuit included in the integrated circuit device for processing a camera signal according to the embodiment of the present invention.

FIG. 3 shows a structural example of the inversion control circuit 103. The inversion control circuit of FIG. 3 includes an inverter 119 which is fed with the internal reference clock 101 and inverts the phase of the internal reference clock 101 and a selector 120 which selectively outputs the internal reference clock 101 and the output clock of the inverter 119. The following will describe the case where the selector 120 selects the output clock of the inverter 119 and the phase of the clock is coarsely adjusted.

An internal clock 104 outputted from the inversion control circuit 103 is outputted to an inverter (inverting circuit) 105 and the clock terminals of the flip-flop circuits of the flip-flop circuit group 106.

The flip-flop circuits of the flip-flop circuit group 106 are fed with the internal data generated by the logic circuit 100 and output the data to the data delay adjustment circuits of a data delay adjustment circuit group 110 in synchronization with the rising edge of the internal clock 104 which is in opposite phase to the internal reference clock 101. Therefore, as shown in FIG. 2, the timing of internal data 108 inputted to the data delay adjustment circuits of the data delay adjustment circuit group 110 is delayed relative to the internal data 102 by a half cycle of the internal reference clock.

The internal clock 104 inputted to the inverter 105 is further inverted in phase. Thus when the selector 120 selects the output clock of the inverter 119, as shown in FIG. 2, an internal clock 107 outputted from the inverter 105 is in phase with the internal reference clock 101.

The internal clock 107 outputted from the inverter 105 is inputted to a clock delay adjustment circuit 109. The clock delay adjustment circuit 109 adjusts the delay of the internal clock 107 and outputs the clock as an external output clock 111 to a clock output terminal 113. Similarly, the internal data outputted from the flip-flop circuits of the flip-flop circuit group 106 is inputted to the data delay adjustment circuits of the data delay adjustment circuit group 110. The data delay adjustment circuits adjust the delays of the internal data and output the data as external output data to the data output terminals of a data output terminal group 114.

Figure 4:
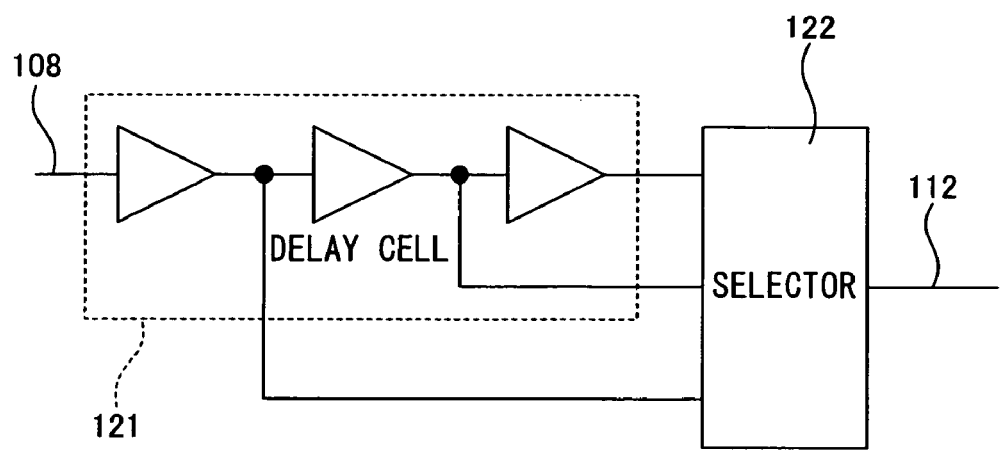
FIG. 4 is a diagram showing a structural example of a delay adjustment circuit included in the integrated circuit device for processing a camera signal according to the embodiment of the present invention.

FIG. 4 shows a structural example of the data delay adjustment circuit. The data delay adjustment circuit of FIG. 4 includes a delay cell group 121, in which delay cells are connected in series in multiple stages, and a selector 122 for selectively outputting the output data of the delay cells. The output of the selector 122 is outputted as external output data to the data output terminal.

The delay cell group 121 sequentially delays the internal data inputted to the data delay adjustment circuit. The number of delay cells is determined such that the total delay is equivalent to the half cycle of the internal reference clock.

The selection in the selector 122 is set so as to synchronize the operation of the data output terminal with the operation of the logic circuit 100. To be specific, in the case where a delay amount caused by the influence of an internal layout between the logic circuit and the data output terminals and an external load is a specific delay amount, a delay adjustment amount is set as below:

(One cycle of the internal reference clock–the specific delay amount)–the half cycle of the internal reference clock (1)

In this way, each of the data delay adjustment circuits adjusts a delay in consideration of a delay amount specific to each of the data output terminals, and thus as shown in FIG. 2, external output data 112 outputted from each of the data delay adjustment circuits is in phase with, without any delay, the internal data 102 outputted from the logic circuit 100. The data delay adjustment circuit of FIG. 4 comprises the four delay cells. The precision in the adjustment of the delay amount can be improved by reducing the delay amount of each delay cell and increasing the number of delay cells.

The clock delay adjustment circuit 109 is also identical in configuration to the data delay adjustment circuit. In consideration of a delay amount specific to the clock output terminal 113, a delay is adjusted according to Formula (1). Therefore, as shown in FIG. 2, the timing of the external output clock 111 outputted from the clock delay adjustment circuit 109 is in opposite phase to the internal reference clock 101 without any delay.

With this configuration, a power fluctuation area 116 of the output terminal is caused by the external output data and the external output clock and distributed from the rising edge of the internal reference clock 101 in a similar manner to a power fluctuation area 115 of the logic circuit 100. As a result, a digital noise area 117 of the integrated circuit device is distributed as shown in FIG. 2. In this way, the integrated circuit device makes it possible to increase a stable area 118 having less noise.

The following will specifically discuss the delay adjustment of the delay adjustment circuit.

As described above, much digital noise occurs when the processing of the digital signal changes. When processing is not performed or the processing of the digital signal does not change, digital noise does not occur. Thus in the integrated circuit device, the area of digital noise is distributed in an area where one of the power fluctuation area of the logic circuit and the power fluctuation area of the output terminal is present, whereas the stable area having less digital noise is distributed in an area where neither of the power fluctuation areas is present. Further, the size of the stable area having less digital noise varies with the frequency. The area increases at a slow frequency, and decreases as the frequency increases.

Assuming that the output terminals have equal specific delay amounts, the size of the area of digital noise can be expressed as below:

The power fluctuation area of the logic circuit+{the power fluctuation area of the output terminal–(the power fluctuation area of the logic circuit–the specific delay amount)} (2)

The stable area can be expressed as below:

One cycle of the internal reference clock–the area of digital noise (3)

For example, when the power fluctuation area of the logic circuit is 10 ns, the power fluctuation area of the output terminal is 12 ns, and the specific delay amount is 5 ns, the size of the area of digital noise is expressed as below according to Formula (2):

10 ns+{12 ns–(10 ns–5 ns)}=17 ns

When the operating frequency is 20 MHz, the size of the stable area having less noise is expressed as below according to Formula (3):

50 ns–17 ns=32 ns

When the operating frequency is 50 MHz, the size of the stable area is expressed as below:

20 ns–17 ns=3 ns

In order to increase the stable area, it is preferable to set the specific delay amount apparently at '0' ns. Thus the size of the area of digital noise is determined as below:

10 ns+{12 ns–(10 ns–0 ns)}=12 ns

Even when the operating frequency is 50 MHz, the size of the stable area having less noise can be obtained as below:

20 ns–12 ns=8 ns

In the integrated circuit device, the internal data outputted by the logic circuit and the internal reference clock are delayed according to the above configuration, so that the specific delay amount is apparently set at '0' ns. For example, when the power fluctuation area of the logic circuit is 10 ns, the power fluctuation area of the output terminal is 12 ns, the specific delay amount is 5 ns, and the operating frequency is 50 MHz, the data delay adjustment circuit and the clock delay adjustment circuit delay inputted data and a clock as below according to Formula (1):

{20 ns (one cycle of the internal reference clock)–5 ns (the delay amount of the output terminal)}–10 ns (the half cycle of the internal reference clock)=5 ns With this delay adjustment, the specific delay amount is apparently set at '0' ns in the end and the power fluctuation area of the output terminal is distributed from the rising edge of the internal reference clock.

The above explanation described that the output terminals have equal specific delay amounts. Even when the specific delay amount varies among the output terminals, delay adjustment can be performed for each of the delay adjustment circuits and thus the specific delay amount can be apparently set at '0' ns for each of the output terminals.

As described above, according to the integrated circuit device of the present embodiment, the external output clock and the external output data are delayed so as to synchronize the operation of the data output terminal with the operation of the logic circuit while keeping the phase relationship between the external output clock and the external output data, so that the power fluctuation area of the output terminal and the power fluctuation area of the logic circuit are overlaid on each other. This operation makes it possible to increase the stable area having less digital noise.

Even in the case where the specific delay amount varies among the output terminals due to a usage environment including the internal layout and an external load, since the delay adjustment circuit is provided for each of the output terminals in the integrated circuit device, delay adjustment can be performed for each of the output terminals and the specific delay amount can be apparently set at '0' ns for each of the output terminals.

Therefore, the camera system using the integrated circuit device makes it possible to facilitate timing adjustment for performing analog processing in the stable area, so that the influence of digital noise is minimized and high picture quality can be achieved. Also in a small camera system having a large number of pixels, it is possible to easily achieve analog processing in a stable area less susceptible to the influence of digital noise. Further, the stable area and the adjustment range become larger and thus the picture quality can be easily adjusted.

Since the stable area increases, high picture quality can be achieved and an operation margin for absorbing the influence of individual variations or the like can be obtained in the camera system.

The above explanation described that the inversion control circuit 103 selects the output clock of the inverter 119. For example, when the specific delay amount determined by a usage environment such as the internal layout and the external load is about the half cycle of the internal reference clock, the inversion control circuit 103 selects the internal reference clock 101. In this way, the inversion control circuit 103 enables delay adjustment of one cycle of the internal reference clock.

In this configuration, the delay adjustment circuit is provided for each of the output terminals to respond to variations in specific delay amount among the output terminals (bits). In the case of a negligible specific delay amount between the output terminals, the delay adjustment circuits may be combined in one unit.

Figure 5:
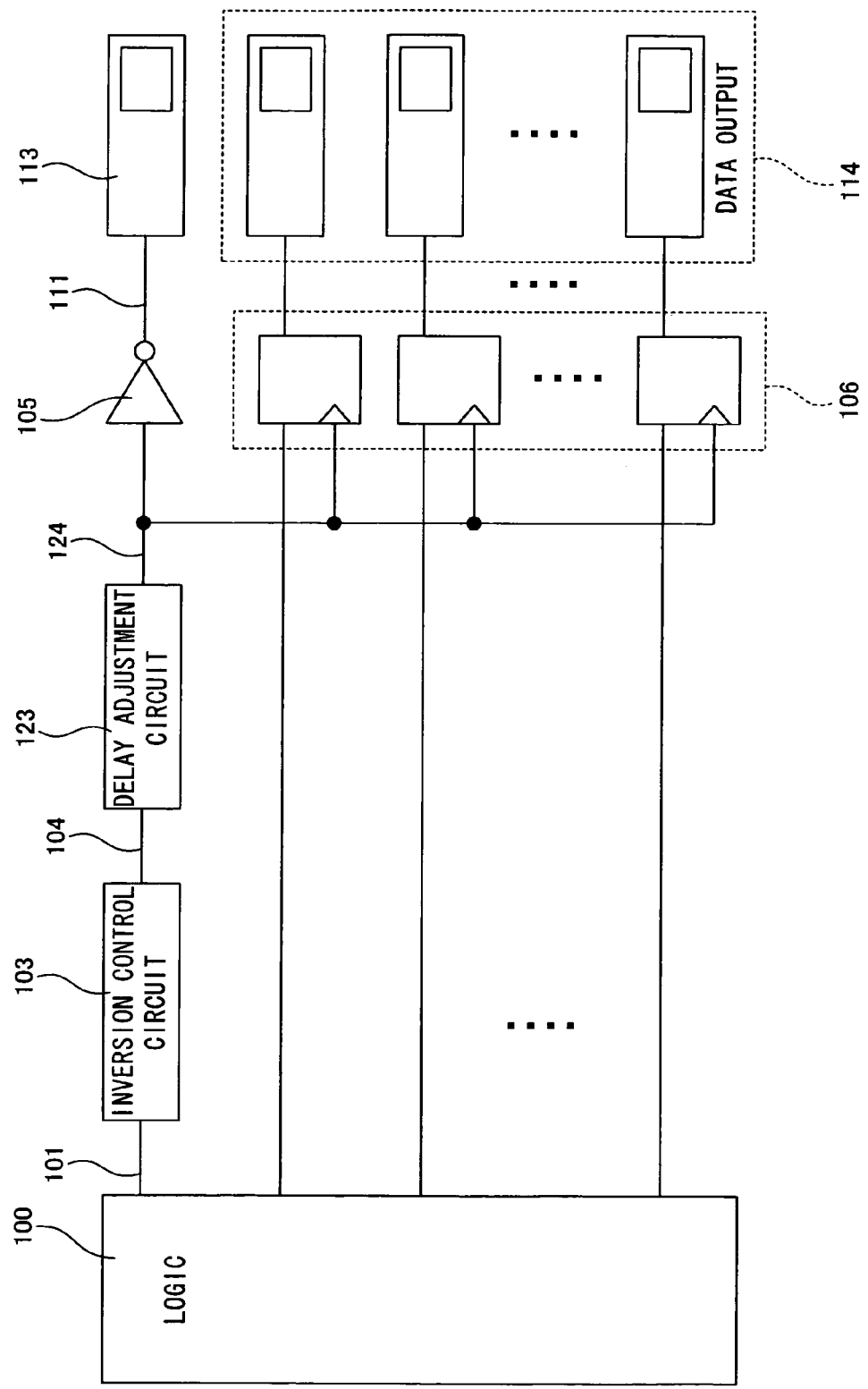
FIG. 5 is a schematic structural diagram showing a part of an integrated circuit device for processing a camera signal according to another embodiment of the present invention.

FIG. 5 is a schematic structural diagram showing a part of an integrated circuit device in which delay adjustment circuits are combined in one unit. The same members as those of FIG. 1 are indicated by the same reference numerals and the detailed explanation thereof is omitted.

In FIG. 5, a delay adjustment circuit 123 is configured as FIG. 4. In consideration of a specific delay amount, the delay of an internal clock 104 outputted from an inversion control circuit 103 is adjusted and the operations of the data output terminals of a data output terminal group 114 are synchronized with the operation of a logic circuit 100.

An internal clock 124 whose delay has been adjusted by the delay adjustment circuit 123 is inputted to an inverter 105 and the clock terminals of the flip-flop circuits of a flip-flop circuit group 106. In this integrated circuit device, a clock outputted from the inverter 105 acts as an external output clock and data outputted from the flip-flop circuits of the flip-flop circuit group 106 acts as external output data.

As a result of the delay adjustment of the delay adjustment circuit 123, as shown in FIG. 2, an external output clock 111 outputted from the inverter 105 is in opposite phase to the internal reference clock 101 without any delay, and external output data 112 outputted from the flip-flop circuits of the flip-flop circuit group 106 is in phase with, without any delay, internal data 102 outputted from the logic circuit 100.

As in the integrated circuit device of FIG. 1, a stable area 118 having less noise can be increased and the same effect can be obtained. When a delay amount specific to each of the output terminals is negligible between the output terminals, the delay adjustment circuits may be combined in one unit.

The above explanation described the delay adjustment circuit using the delay cells which are sensitive to temperature changes and process variations. The delay adjustment circuit may use a clock n-times (n is a positive integer) in frequency than that of the internal reference clock in order to prevent the delay cells from being sensitive to temperature changes and process variations.

Figure 6:
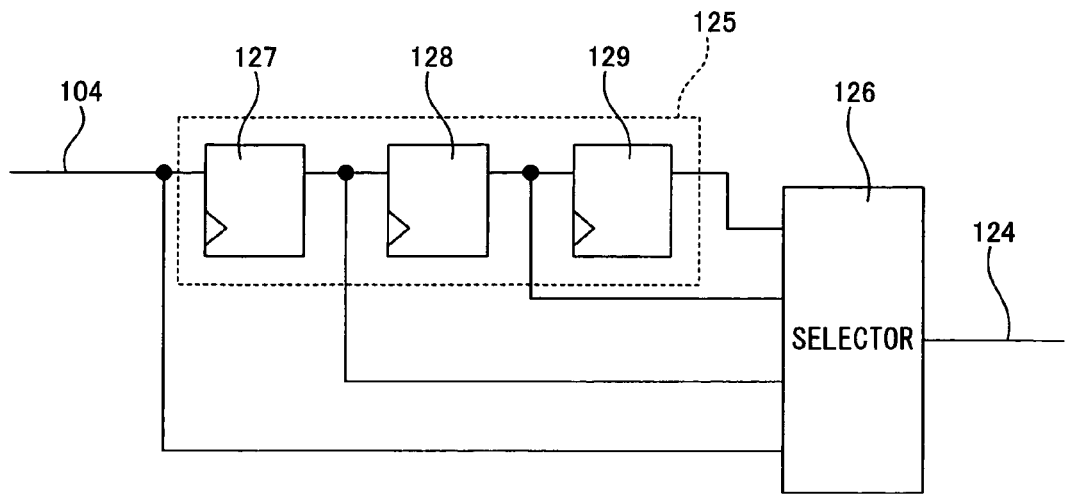
FIG. 6 is a diagram showing another structural example of a delay adjustment circuit included in the integrated circuit device for processing a camera signal according to the embodiment of the present invention.
Figure 7:
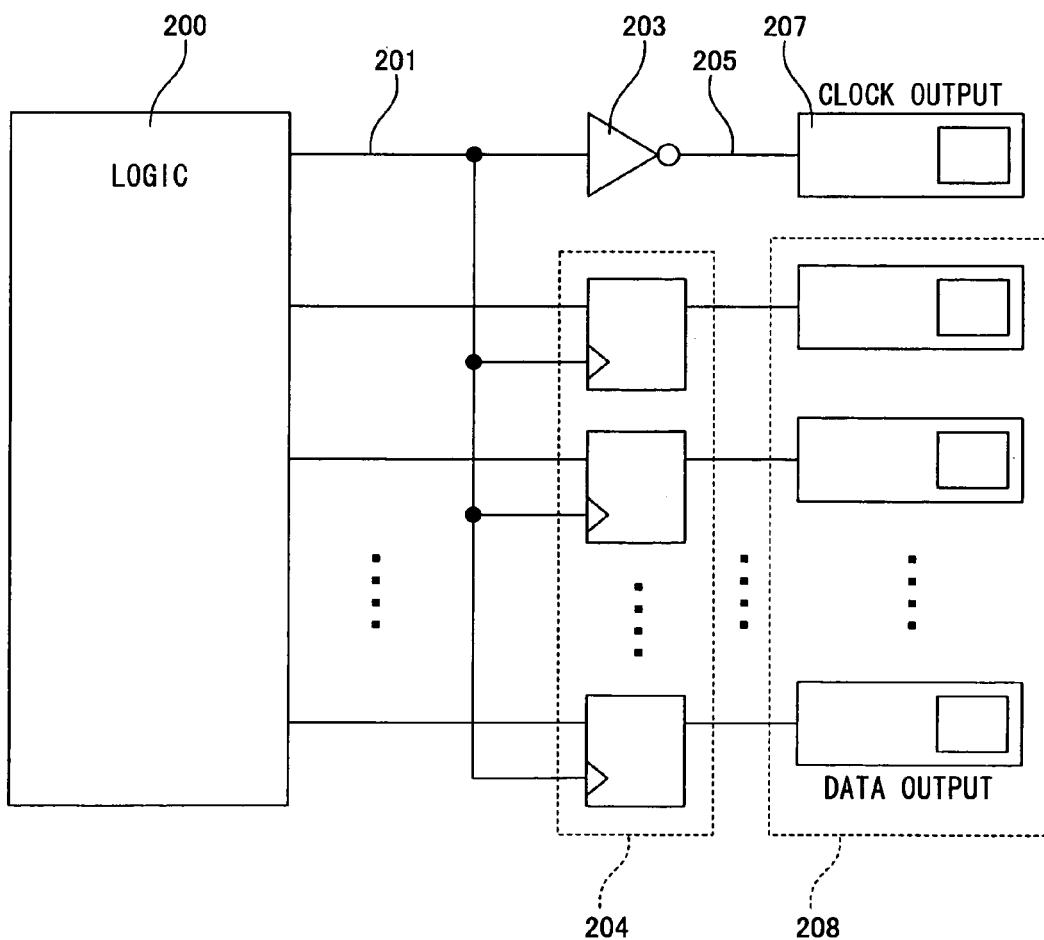
FIG. 7 is a schematic structural diagram showing a part of a conventional integrated circuit device for processing a camera signal.
Figure 8:
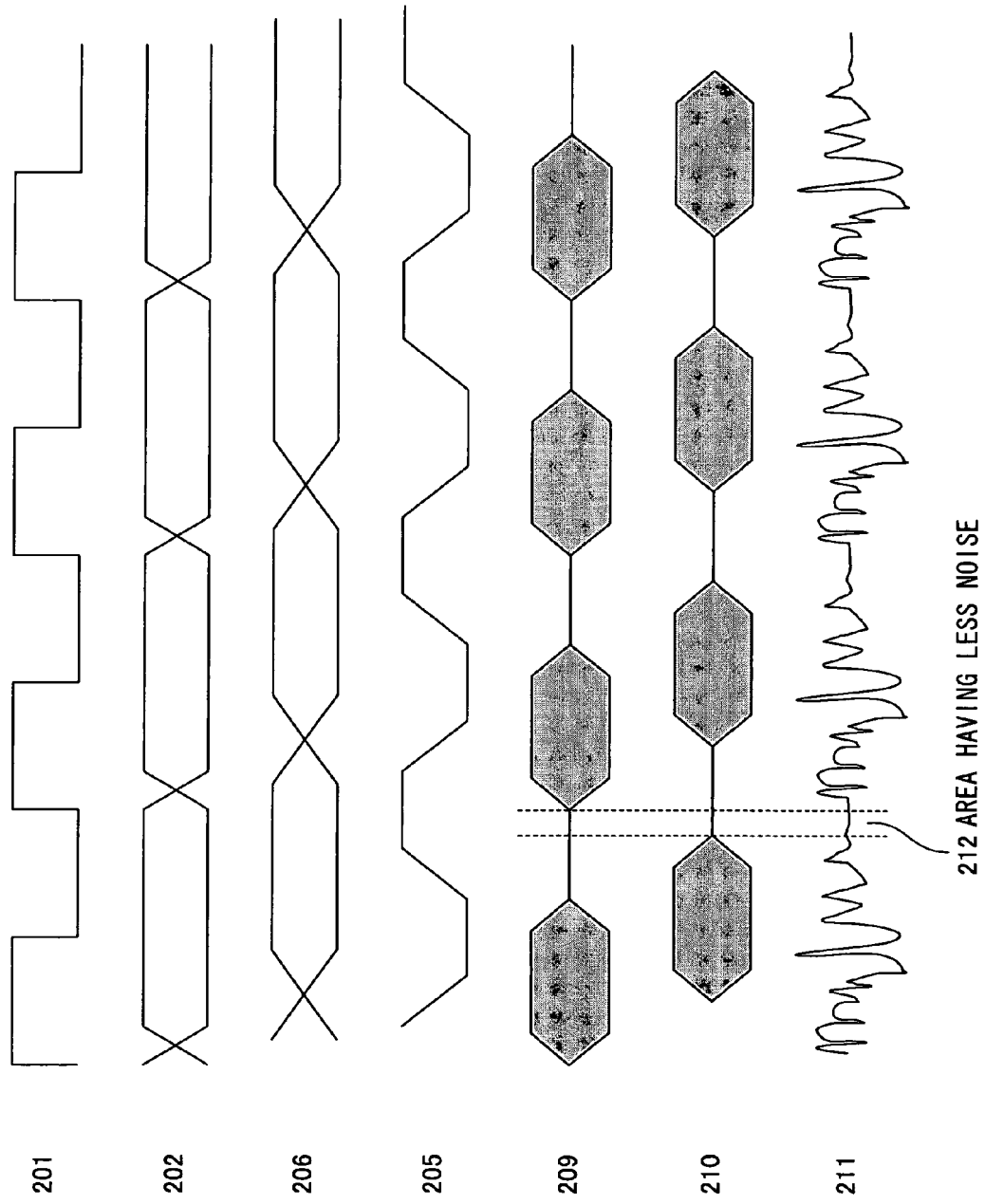
FIG. 8 is a diagram showing a timing chart for explaining the operations of the conventional integrated circuit device for processing a camera signal.

FIG. 6 shows the configuration of a delay adjustment circuit using the n-times clock.

The delay adjustment circuit of FIG. 6 includes a flip-flop circuit group 125, in which flip-flop circuits are connected in series in multiple stages, and a selector 126 for selectively outputting the output data of the flip-flop circuits. Flip-flop circuits 127 to 129 of the flip-flop circuit group 125 are fed with a clock n-times in frequency than that of the internal reference clock. The flip-flop circuits 127 to 129 operating in synchronization with the clock sequentially delay the internal clock 104 inputted to the delay adjustment circuit 123.

For example, in the case of a clock eight times as high as the internal reference clock, the output clock of the flip-flop circuit 127 of the first stage is delayed by a one-eighth cycle of the internal reference clock relative to the internal clock 104 inputted to the delay adjustment circuit 123, the output clock of the flip-flop circuit 128 of the subsequent stage is delayed by a two-eighths cycle of the internal reference clock relative to the internal clock 104 inputted to the delay adjustment circuit 123, and the output clock of the flip-flop circuit 129 of the final stage is delayed by a three-eighths cycle of the internal reference clock A combination of the delay adjustment circuit 123 and the inversion control circuit 103 enables delay adjustment while dividing one cycle of the internal reference clock into eight from (0/8) to (7/8). The delay adjustment circuit of FIG. 6 comprises the three flip-flop circuits. The precision in the adjustment of a delay amount can be improved by increasing the number of multiplications (n) and increasing the number of flip-flop circuits.

The above explanation described that delay adjustment is performed with a combination of the inversion control circuit and the delay adjustment circuit. Delay adjustment of one cycle of the internal reference clock may be performed only with the delay adjustment circuit.

The above explanation described the integrated circuit device for processing a camera signal. The present invention is applicable to an integrated circuit device which includes at least a logic circuit serving as a synchronous circuit and outputs in parallel data generated in the logic circuit, the data being outputted with an internal reference clock used in the logic circuit.

The integrated circuit device of the present invention is useful for a camera system or the like in which an area having less digital noise can be increased, a signal obtained from an image sensor or the like is subjected to analog signal processing and digitally converted, and then the signal is subjected to digital processing and outputted as a digital video signal.

What is claimed is:

1. An integrated circuit device which includes a logic circuit operating in synchronization with an internal reference clock and performing signal processing on a digital signal to generate multiple pieces of data, adjusts a phase of the internal reference clock to generate an external output clock, adjusts a phase of the data generated by the logic circuit to generate external output data, and outputs the clock and the data in parallel from a clock output terminal and data output terminals, the integrated circuit device, comprising:

a delay adjustment circuit which is fed with the internal reference clock and adjusts a delay of the clock, flip-flop circuits which are fed with the data generated by the logic circuit and output the data as the external output data to the data output terminals in synchronization with a clock outputted from the delay adjustment circuit, and an inverting circuit for inverting the clock outputted by the delay adjustment circuit and outputting the clock as the external output clock to the clock output terminal.

2. The integrated circuit device according to claim 1, wherein the delay adjustment circuit adjusts the delay so as to synchronize operations of the data output terminals with an operation of the logic circuit.

3. The integrated circuit device according to claim 1, further comprising an inversion control circuit which is fed with the internal reference clock and selects whether the internal reference clock should be inverted and outputted or outputted as it is to the delay adjustment circuit.

4. The integrated circuit device according to claim 1, wherein the delay adjustment circuit comprises flip-flop circuits placed in series in multiple stages and a selector for selectively outputting outputs of the flip-flop circuits, the flip-flop circuit operating in synchronization with a clock n-times (n is a positive integer) in frequency of the internal reference clock.

* * * * *